(12) United States Patent
Pak et al.

(10) Patent No.: US 7,692,729 B2
(45) Date of Patent: Apr. 6, 2010

(54) LIQUID CRYSTAL DISPLAY INCLUDING SENSING UNIT

(75) Inventors: Sang-Jin Pak, Yongin-si (KR); Myung-Woo Lee, Seoul (KR); Kee-Han Uh, Yongin-si (KR); Joo-Hyung Lee, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 478 days.

(21) Appl. No.: 11/493,223

(22) Filed: Jul. 26, 2006

(65) Prior Publication Data

US 2007/0030221 A1  Feb. 8, 2007

(30) Foreign Application Priority Data

Aug. 4, 2005  (KR) .................... 10-2005-0071342

(51) Int. Cl.
*G02F 1/1343* (2006.01)

(52) U.S. Cl. ................ 349/38; 345/173; 345/174
(58) Field of Classification Search .................... None
See application file for complete search history.

(56) References Cited

U.S. PATENT DOCUMENTS 6,947,102 B2 *  9/2005  den Boer et al. ............ 349/12
7,379,054 B2 *  5/2008  Lee .......................... 345/173

* cited by examiner

*Primary Examiner*—Sung H Pak
*Assistant Examiner*—Chad H Smith
(74) *Attorney, Agent, or Firm*—Cantor Colburn LLP

(57) ABSTRACT

A liquid crystal display is provided. The liquid crystal display includes a first panel, a second panel facing and separated from the first panel, a liquid crystal layer interposed between the first and second panels, a plurality of variable capacitors that vary capacitance thereof by pressure, and a plurality of reference capacitors formed on the second panel and connected to the variable capacitors.

22 Claims, 10 Drawing Sheets

LIQUID CRYSTAL DISPLAY INCLUDING SENSING UNIT

The present application claims priority to Korean Patent Application No. 2005-0071342, filed on Aug. 4, 2005, and all the benefits accruing therefrom under 35 U.S.C. §119, the contents of which are incorporated herein by reference in its entirety.

BACKGROUND OF THE INVENTION (a) Field of the Invention

The present invention relates generally to a liquid crystal display and, more particularly, to a liquid crystal display including a sensing unit.

(b) Description of the Related Art

Liquid crystal displays (LCDs) typically include a pair of panels that are provided with pixel electrodes and a common electrode, as well as a liquid crystal layer with dielectric anisotropy interposed between the two panels. The pixel electrodes are usually arranged in a matrix pattern and are connected to switching elements, such as thin film transistors (TFTs), such that they receive image data voltages row by row. The common electrode covers the entire surface of one of the two panels and it is supplied with a common voltage. A pixel electrode and corresponding portions of the common electrode and corresponding portions of the liquid crystal layer form a liquid crystal capacitor that, along with a switching element connected thereto, is a basic element of a pixel.

An LCD generates electric fields by applying voltages to pixel electrodes and a common electrode, and the strength of the electric fields applied thereto are varied in order to adjust the transmittance of light passing through a liquid crystal layer, thereby displaying images.

Touch screen panels write or draw letters or pictures by touching a finger, touch pen, or a stylus to a display panel or carry out desired operations of machines such as computers, etc. by operating icons. LCDs attached to the touch screen panels determine whether contact is made with the display panel (e.g., via a finger, the touch pen, etc.) and, if so, a corresponding touch position. While these panels provide certain advantages, the manufacturing costs of the LCDs that incorporate touch screen panels increase as compared to the costs of LCDs that do not employ touch screen panels. Furthermore, the process used in attaching the touch screen panel to the LCD causes a reduction in the yield and the luminance of the LCD, as well as an increase in the thickness of the LCD.

For solving the above problems, a plurality of photo sensing units, which are implemented with thin film transistors, may be integrated into pixels displaying images of the LCD. The photo sensing unit senses the variation of light incident upon the display panel by a touch of the finger or an implement of a user, to determine whether there has been contact with the display panel and a touch position. However, these photo sensing units influence characteristics such as intensity of external light, intensity of light from a back light unit included in the LCD, and temperature, thereby resulting in a decrease in the accuracy of a corresponding sensing operation.

SUMMARY OF THE INVENTION

A motivation of the present invention is to solve the problems of the conventional techniques described above.

In an exemplary embodiment of the preset invention, a liquid crystal display is provided including a first panel, a second panel facing and separated from the first panel, a liquid crystal layer interposed between the first and second panels, a plurality of variable capacitors in which capacitance thereof is varied by pressure, and a plurality of reference capacitors formed on the second panel and connected to the variable capacitors.

Each variable capacitor may include a first capacitance electrode formed on the first panel and a second capacitance electrode formed on the second panel.

The distance between the first and second capacitance electrodes may be varied by pressure, and the capacitance of the variable capacitor may be varied based on the variation of the distance.

The first capacitance electrode may be supplied with a predetermined voltage, which swings between two magnitudes thereof.

The liquid crystal display may further include a plurality of sensor scanning lines formed on the second panel and connected to the reference capacitors.

The liquid crystal display may further include a plurality of sensor data lines formed on the second panel and connected to the variable capacitors and the reference capacitors.

The liquid crystal display may further include a plurality of switching circuits connected to the sensor data lines and charging contact points between the reference capacitors and the variable capacitors with predetermined voltages.

The liquid crystal display may further include a plurality of image scanning lines formed on the second panel, a plurality of image data lines intersecting the image scanning lines, and a plurality of pixels connected to the image scanning lines and the image data lines.

The reference capacitors may be respectively connected to the image scanning lines.

In a further exemplary embodiment of the present invention, a liquid crystal display is provided including a plurality of image scanning lines, a plurality of image data lines intersecting the image scanning lines, a plurality of sensor data lines intersecting the image scanning lines, a plurality of pixels connected to the image scanning lines and the image data lines, and a plurality of sensing units connected to the sensor data lines, wherein the pixels comprise liquid crystal capacitors and switching elements connected to the liquid crystal capacitors, one of the image scanning lines, and one of the image data lines, respectively, and the sensing units are connected to the sensor data lines and comprise variable capacitors varying capacitance thereof by a touch and reference capacitors connected to the sensor data lines and the variable capacitors, respectively.

The variable capacitor may include a sensing electrode, a common electrode facing the sensing electrode, and a liquid crystal dielectric interposed between the sensing electrode and the common electrode.

The sensor data line may include the sensing electrode.

The liquid crystal capacitor may include a pixel electrode, a common electrode facing the pixel electrode, and a liquid crystal dielectric interposed between the pixel electrode and the common electrode.

The liquid crystal display may further include an image scanning driver for applying image scanning signals to the image scanning lines, an image data driver for applying image data signals to the image data lines, a sensing signal processor for processing sensing signals from the sensor data lines, and a signal controller for controlling the image scanning driver, the image data driver, and the sensing signal processor.

The reference capacitors may be connected to the image scanning line, respectively.

The liquid crystal display may further include a plurality of sensor scanning lines connected to the reference capacitors.

The liquid crystal display may further include an image scanning driver for applying image scanning signals to the image scanning lines, an image data driver for applying image data signals to the image data lines, a sensor scanning driver for applying sensor scanning signals to the sensor scanning lines, a sensing signal processor for processing sensing signals from the sensor data lines, and a signal controller for controlling the image scanning driver, the image data driver, the sensor scanning driver, and the sensing signal processor.

In a still further exemplary embodiment of the present invention, a liquid crystal display is provided including a first panel, a common electrode formed on the first panel, a second panel facing and separated from the first panel, an image scanning line formed on the second panel, an image data line formed on the second panel and intersecting the image scanning line, a thin film transistor connected to the image scanning line and the image data line, a pixel electrode connected to the thin film transistor and facing the common electrode, a sensor data line formed on the second panel, extending in parallel to the image data line, and facing the common electrode, a reference electrode formed on the second panel and facing the sensor data line, and a liquid crystal layer interposed between the first and second panel.

The reference electrode may extend from the image scanning line.

The liquid crystal display may further include a sensor scanning line formed on the second panel and extending in parallel to the image scanning line, and the reference electrode extending from the sensor scanning line.

The sensor data line may be formed on the same layer as the image data line.

The sensor data line may be formed on the same layer as the pixel electrode.

The pixel electrode may include a transmissive electrode and a reflective electrode, and the sensor data line is formed on the same layer as one of the transmissive electrode and the reflective electrode.

The liquid crystal display may further include a spacer disposed between the first and second panels for supporting the first and second panels and providing a predetermined gap therebetween.

The liquid crystal display may further include an insulator disposed between the reference electrode and the sensor data line.

BRIEF DESCRIPTION OF THE DRAWINGS

The present invention will become more apparent by describing preferred embodiments thereof in detail with reference to the accompanying drawings, in which.

DETAILED DESCRIPTION OF THE INVENTION

Figure 1:
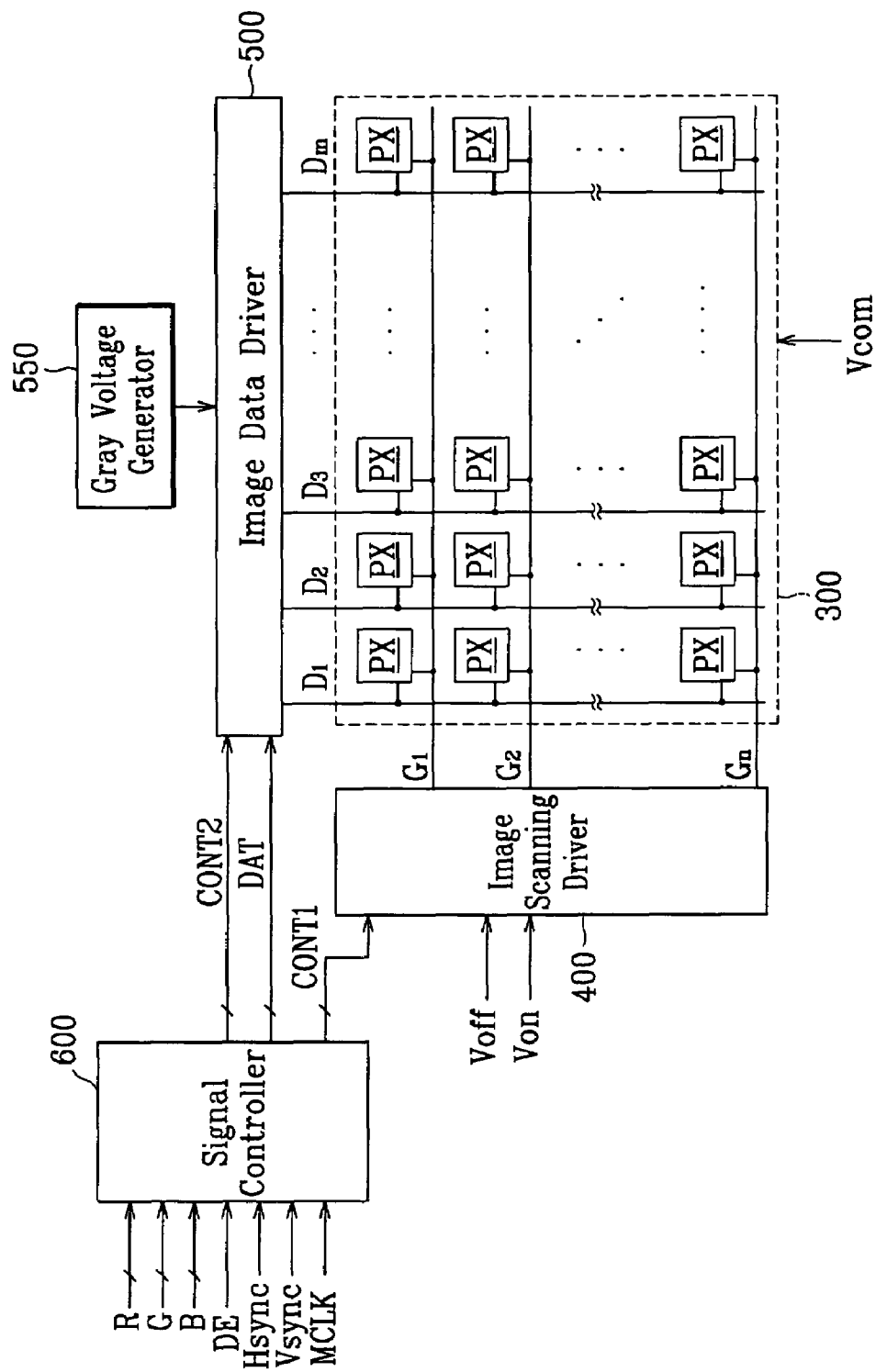
FIG. 1 is a block diagram of an LCD showing pixels according to an exemplary embodiment of the present invention.

The present invention will be described more fully hereinafter with reference to the accompanying drawings, in which exemplary embodiments of the present invention are shown. This invention may, however, be embodied in many different forms and should not be construed as limited to the exemplary embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An LCD according to exemplary embodiments of the present invention will now be described with reference to FIGS. 1 through 4.

Figure 2:
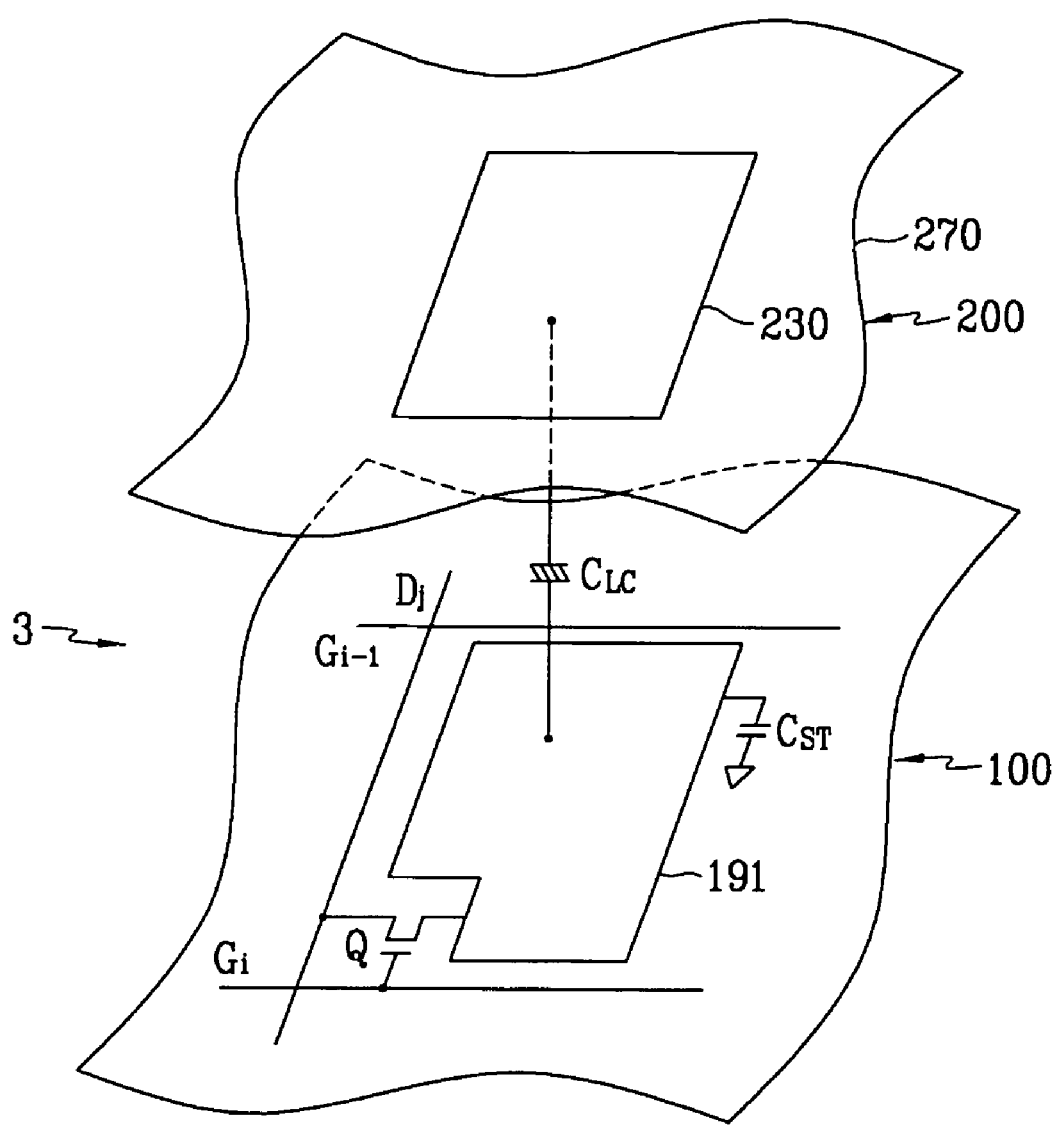
FIG. 2 is an equivalent circuit diagram of a pixel of an LCD according to an exemplary embodiment of the present invention.
Figure 3:
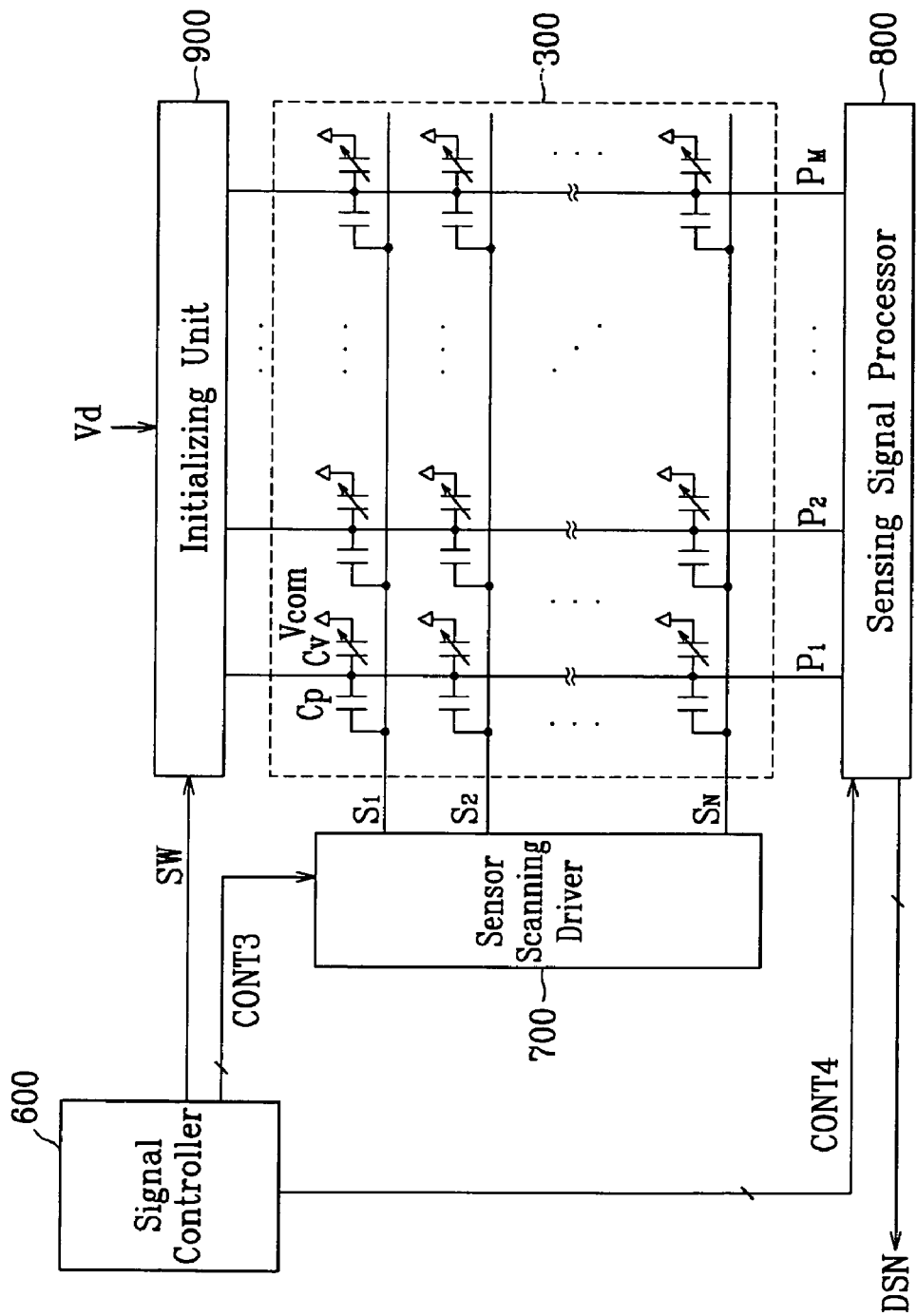
FIG. 3 is a block diagram of an LCD showing sensing units according to an exemplary embodiment of the present invention.
Figure 4:
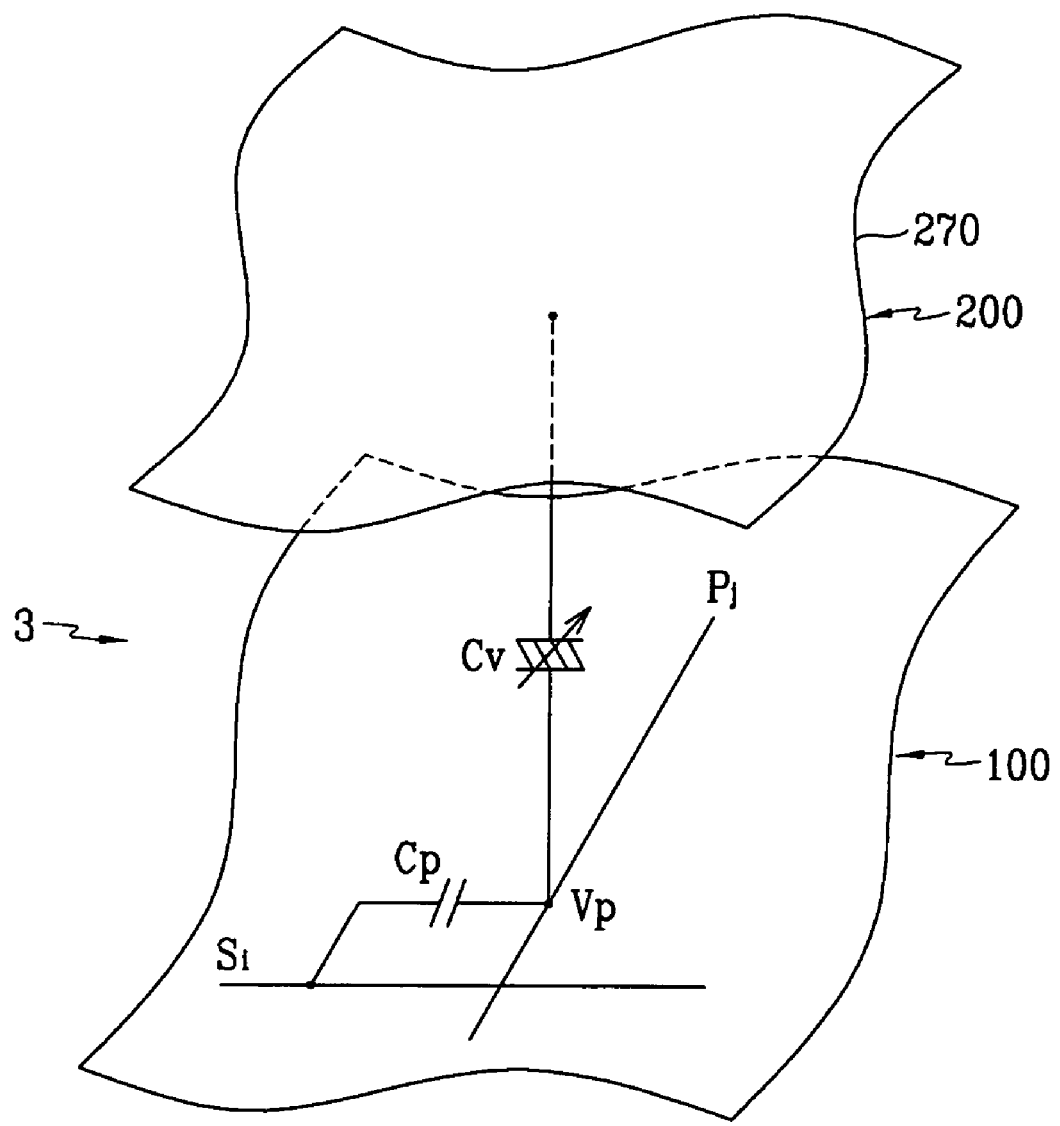
FIG. 4 is an equivalent circuit diagram of a sensing unit of an LCD according to an exemplary embodiment of the present invention.

FIG. 1 is a block diagram of an LCD shown in view of pixels according to an exemplary embodiment of the present invention. FIG. 2 is an equivalent circuit diagram of a pixel of an LCD according to an exemplary embodiment of the present invention. FIG. 3 is a block diagram of an LCD shown in view of sensing units according to an exemplary embodiment of the present invention. FIG. 4 is an equivalent circuit diagram of a sensing unit of an LCD according to an exemplary embodiment of the present invention.

As shown in FIGS. 1 and 3, an LCD according to an exemplary embodiment of the present invention includes a liquid crystal (LC) panel assembly 300, an image scanning driver 400 (FIG. 1), an image data driver 500 (FIG. 1), a sensor scanning driver 700 (FIG. 3), a sensing signal processor 800 (FIG. 3), and an initializing unit 900 (FIG. 3) that are coupled with the panel assembly 300. Also, a gray voltage generator 550 (FIG. 1) is coupled to the image data driver 500. A signal controller 600 is also provided for controlling the above-referenced elements as described further herein.

The panel assembly 300, in an equivalent circuital view, includes a plurality of signal lines $G_1$-$G_n$ and $D_1$-$D_m$, a plurality of pixels PX, a plurality of sensor signal lines $S_1$-$S_N$ and $P_1$-$P_M$, and a plurality of sensing units. The pixels PX are connected to the signal lines $G_1$-$G_n$ and $D_1$-$D_m$ and are arranged substantially in a matrix. The sensing units are connected to the sensor signal lines $S_1$-$S_N$ and $P_1$-$P_m$ and arranged substantially in a matrix. The panel assembly 300, in a structural view shown in FIGS. 2 and 4, includes a lower panel 100, an upper panel 200, a liquid crystal layer 3 interposed therebetween, and a plurality of spacers (not shown). The spacers form a gap between the panels 100 and 200 and are transformed by pressure applied from the outside.

The signal lines $G_1$-$G_n$ and $D_1$-$D_m$ include a plurality of image scanning lines $G_1$-$G_n$ for transmitting image scanning signals and a plurality of image data lines $D_1$-$D_m$ for transmitting image data signals.

The sensor signal lines $S_1$-$S_N$ and $P_1$-$P_m$ include a plurality of sensor scanning lines $S_1$-$S_N$ for transmitting sensor scanning signals and a plurality of sensor data lines $P_1$-$P_M$ for transmitting sensor data signals.

As shown in FIGS. 1 and 3, the image scanning lines $G_1$-$G_n$ and the sensor scanning lines $S_1$-$S_N$ extend substantially in a row direction and are substantially parallel to each other, while the image data lines $D_1$-$D_m$ and the sensor data lines $P_1$-$P_M$ extend substantially in a column direction and are substantially parallel to each other.

Referring to FIG. 2, each pixel PX, for example, a pixel PX in the i-th row (i=1, 2, . . . , n) and the j-th column (j=1, 2, . . . , m), is connected to signal lines $G_i$ and $D_j$ and includes a switching element Q connected to the signal lines $G_1$-$G_n$ and $D_1$-$D_m$, and an LC capacitor $C_{LC}$ and a storage capacitor $C_{ST}$ that are connected to the switching element Q. However, it will be understood that the storage capacitor $C_{ST}$ may be omitted.

The switching element Q, such as a TFT, is provided on the lower panel 100 and has three terminals: a control terminal connected to one of the image scanning lines $G_1$-$G_n$; an input terminal connected to one of the image data lines $D_1$-$D_m$; and an output terminal connected to the LC capacitor $C_{LC}$ and the storage capacitor $C_{ST}$.

The LC capacitor $C_{LC}$ includes a pixel electrode 191 provided on the lower panel 100 and a common electrode 270 provided on the upper panel 200, as two terminals. The LC layer 3 disposed between the two electrodes 191 and 270 functions as a dielectric of the LC capacitor $C_{LC}$. The pixel electrode 191 is connected to the switching element Q, and the common electrode 270 is supplied with a common voltage Vcom (FIGS. 1, 3) and covers an entire surface of the upper panel 200. While shown on the upper panel 200 in FIG. 2 for illustrative purposes, it will be understood that the common electrode 270 may be provided on the lower panel 100, and both electrodes 191 and 270 may have shapes comprising, e.g., bars or stripes.

The storage capacitor $C_{ST}$ is an auxiliary capacitor for the LC capacitor $C_{LC}$. The storage capacitor $C_{ST}$ includes the pixel electrode 191 and a separate signal line (not shown), which is provided on the lower panel 100, overlaps the pixel electrode 191 via an insulator (not shown), and is supplied with a predetermined voltage such as the common voltage Vcom. In alternative embodiments, the storage capacitor $C_{ST}$ includes the pixel electrode 191 and an adjacent image scanning line (one of $G_1$-$G_n$), called a previous image scanning line, which overlaps the pixel electrode 191 via an insulator.

For color display, each pixel PX uniquely represents one of various colors (i.e., spatial division) or each pixel PX sequentially represents the colors (e.g., primary colors) in turn (i.e., temporal division) such that a spatial or temporal sum of the colors is recognized as a desired color. An example of a set of the colors includes primary colors of red, green, and blue. FIG. 2 shows an example of the spatial division in which each pixel PX includes a color filter 230 representing one of the colors in an area of the upper panel 200 facing the pixel electrode 191. In alternative exemplary embodiments, the color filter 230 is provided on or under the pixel electrode 191 on the lower panel 100.

Referring to FIG. 4, each sensing unit, for example, a sensing unit in the i-th row (i=1, 2, . . . , N) and the j-th column (j=1, 2, . . . , M), is connected to a sensor scanning line $S_i$ and a sensor data line $P_j$ and includes a reference capacitor Cp connected between the lines $S_i$ and $P_j$ and a variable capacitor Cv connected to the reference capacitor Cp. The number of sensing units is less than the number of pixels PX. In other words, "N" is less than or equal to "n", and "M" is less than or equal to "m." In exemplary embodiments, n is a multiple of N and m is a multiple of M.

The reference capacitor Cp is formed between the signal lines $S_i$ and $P_j$ via an insulator.

The variable capacitor Cv includes the sensor data line $P_j$ and the common electrode 270 provided on the upper panel 200 as two terminals and an LC layer 3 interposed therebetween, which functions as an insulator. The capacitance of the variable capacitor Cv varies by external stimulus such as a touch of a user, which is applied to the LC panel assembly 300. An example of the external stimulus is pressure, and the distance between the two terminals of the variable capacitor Cv is varied by the pressure applied to the LC panel assembly 300 to vary the capacitance of the variable capacitor Cv. By the variation of the capacitance of the variable capacitor Cv, a voltage Vp (referred to as "a contact voltage") of a contact point between the reference capacitor Cp and the variable capacitor Cv is varied and is outputted as a sensor data signal to a sensor data line $P_1$-$P_M$.

One or more polarizers (not shown) are attached to at least one of the panels 100 and 200.

The image scanning lines $G_1$-$G_n$ may function as the sensor scanning lines $S_1$-$S_N$ if the sensor scanning lines $S_1$-$S_N$ are not formed. For example, if the number of pixel rows is four times larger than the number of the sensor rows, the image scanning lines $G_4$, $G_8$, $G_{12}$, ..., $G_{4k}$ function as the sensor scanning lines $S_1$-$S_N$.

Referring again to FIGS. 1 and 3, the gray voltage generator 550 generates two sets of gray voltages (or reference gray voltages) related to a transmittance of the pixels. The gray voltages in the first set have a positive polarity with respect to the common voltage Vcom, while the gray voltages in the second set have a negative polarity with respect to the common voltage Vcom.

The image scanning driver 400 shown in FIG. 1 is connected to the image scanning lines $G_1$-$G_n$ of the panel assembly 300 and synthesizes a first high voltage and a first low voltage to generate the image scanning signals for application to the image scanning lines $G_1$-$G_n$.

The image data driver 500 shown in FIG. 1 is connected to the image data lines $D_1$-$D_m$ of the panel assembly 300 and applies image data signals selected from the gray voltages to the image data lines $D_1$-$D_m$. However, it will be understood that the image data driver 500 may generate gray voltages for both sets of gray voltages by dividing the reference gray voltages and selecting the data voltages from the generated gray voltages when the gray voltage generator 550 generates reference gray voltages.

As shown in FIG. 3, the sensor scanning driver 700 is connected to the sensor scanning lines $S_1$-$S_N$ of the panel assembly 300 and synthesizes a second high voltage and a second low voltage to generate the sensor scanning signals for application to the sensor scanning lines $S_1$-$S_N$. One terminal of each reference capacitor Cp connected to each sensor scanning line $S_1$-$S_N$ is sequentially supplied with the second voltage in accordance with the sensor scanning signals. When the image scanning lines $G_1$-$G_n$ (FIG. 1) are used as the sensor scanning lines $S_1$-$S_N$, the image scanning driver 400 (FIG. 1) functions as the sensor scanning driver 700 (FIG. 3) and the sensor scanning driver 700 may be omitted.

As shown in FIG. 3, the sensing signal processor 800 is connected to the sensor data lines $P_1$-$P_M$ of the display panel 300 and processes the sensor data signals from the sensor data lines $P_1$-$P_M$.

The initializing unit 900 of FIG. 3 includes a plurality of switching elements (not shown) and is supplied with an initializing voltage Vd through the sensor data lines $P_1$-$P_M$.

The signal controller 600 controls the image scanning driver 400, the image data driver 500, the sensor scanning driver 700, the sensing signal processor 800, and the initializing unit 900 etc.

Referring to FIGS. 1 and 3, each of the aforementioned units 400, 500, 550, 600, 700, 800, and 900 may include at least one integrated circuit (IC) chip mounted on the LC panel assembly 300 or on a flexible printed circuit (FPC) film as a tape carrier package (TCP) type, which are attached to the panel assembly 300. In alternative embodiments, at least one of the units 400, 500, 550, 600, 700, 800, and 900 may be integrated with the panel assembly 300 along with the signal lines $G_1$-$G_n$, $D_1$-$D_m$, $S_1$-$S_N$, and $P_1$-$P_M$ and the switching elements Q. As a further alternative, all the units 400, 500, 550, 600, 700, 800, and 900 may be integrated into a single IC chip, but at least one of the units 400, 500, 550, 600, 700, 800, and 900 or at least one circuit element of at least one of the units 400, 500, 550, 600, 700, 800, and 900 may be disposed outside of the single IC chip.

Operation of the LCD will now be described in accordance with exemplary embodiments and with reference to FIGS. 1 through 4.

As shown in FIG. 1, the signal controller 600 is supplied with input image signals R, G, and B and input control signals for controlling the display thereof from an external graphics controller (not shown). The input image signals R, G, and B contain luminance information of each pixel PX, and the luminance has a predetermined number of grays, for example, 1024 ($=2^{10}$), 256 ($=2^8$) or 64 ($=2^6$). The input control signals include a vertical synchronization signal Vsync, a horizontal synchronization signal Hsync, a main clock signal MCLK, a data enable signal DE, etc.

On the basis of the input control signals and the input image signals R, G, and B, the signal controller 600 generates image scanning control signals CONT1, image data control signals CONT2, sensor scanning control signals CONT3, and sensor data control signals CONT4, and it processes the image signals R, G, and B to be suitable for the operation of the panel assembly 300 (i.e., DAT signals shown in FIG. 1). The signal controller 600 sends the image scanning control signals CONT1 to the image scanning driver 400, the processed image signals DAT and the image data control signals CONT2 to the image data driver 500, the sensor scanning control signals CONT3 to the sensor scanning driver 700, and the sensor data control signals CONT4 to the sensing signal processor 800.

The image scanning control signals CONT1 include an image scanning start signal STV for instructing an image scanning start operation and at least one clock signal for controlling the output time of the first high voltage. The image scanning control signals CONT1 may include an output enable signal OE for defining the duration of the first high voltage.

The image data control signals CONT2 include a horizontal synchronization start signal STH for informing a start of image data transmission for a group of pixels PX, a load signal LOAD for instructing application of the image data signals to the image data lines $D_1$-$D_m$, and a data clock signal HCLK. The image data control signals CONT2 may further include an inversion signal RVS for reversing the polarity of the image data signals (e.g., with respect to the common voltage Vcom).

Responsive to the image data control signals CONT2 from the signal controller 600 (FIG. 1), the image data driver 500 receives a packet of the digital image data DAT for the group of pixels PX from the signal controller 600 and receives one of the two sets of the gray voltages supplied from the gray voltage generator 550. The image data driver 500 converts the processed image signals DAT into analog image data voltages selected from the gray voltages supplied from the gray voltage generator 550, and applies the image data voltages to the image data lines $D_1$-$D_m$.

The image scanning driver 400 (FIG. 1) applies the first high voltage (Von) to the image scanning lines $G_1$-$G_n$ in response to receiving the image scanning control signals CONT1 from the signal controller 600, thereby turning on the switching elements Q connected thereto. The image data voltages applied to the image data lines $D_1$-$D_m$ are supplied to the pixels PX through the activated switching elements Q.

A difference between the voltage of an image data signal and the common voltage Vcom is represented as a voltage across the LC capacitor $C_{LC}$ (FIG. 2), which is referred to as a pixel voltage. The LC molecules in the LC capacitor $C_{LC}$ have orientations depending on the magnitude of the pixel voltage, and the molecular orientations determine the polarization of light passing through the LC layer 3 (FIG. 2). The polarizer(s) converts the light polarization into the light transmittance to display images.

By repeating this procedure by a unit of a horizontal period (also referred to as "1H", which is equal to one period of the horizontal synchronization signal Hsync and the data enable signal DE), all image scanning lines $G_1$-$G_n$ are sequentially supplied with the first high voltage, thereby applying the image data signals to all pixels PX to display an image for a frame.

When the next frame starts after a previous frame finishes, the inversion control signal RVS applied to the image data driver 500 is controlled such that the polarity of the data voltages is reversed (which is referred to herein as "frame inversion"). The inversion control signal RVS may also be controlled such that the polarity of the image data signals flowing in an image data line is periodically reversed during one frame (for example, row inversion and dot inversion), or the polarity of the image data signals in one packet is reversed (for example, column inversion and dot inversion).

As shown in FIG. 3, the initializing unit 900 applies the initializing voltage Vd to the sensor data lines $P_1$-$P_M$ for a predetermined time in accordance with a switching signal received from the signal controller 600, to charge a contact point between the variable capacitor Cv and the reference capacitor Cp to the initializing voltage Vd.

In response to the sensor scanning control signals CONT3, the sensor scanning driver 700 sequentially applies the sensor scanning signal to the sensor scanning lines $S_1$-$S_N$.

In response to the sensor data control signals CONT4, the sensing signal processor 800 reads the sensor data signals and processes the sensor data signals.

The sensing operation according to an exemplary embodiment of the present invention will now be described with reference to FIGS. 1 through 5.

Figure 5:
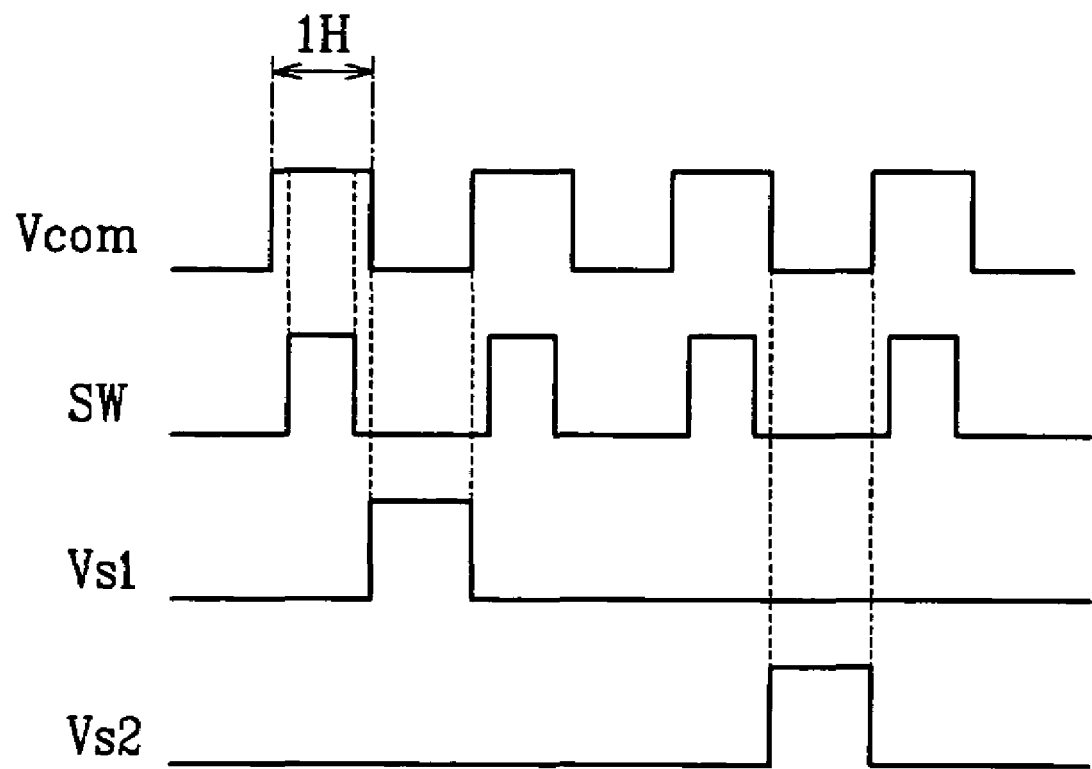
FIG. 5 is a timing chart illustrating common voltage and sensor scanning signals in an exemplary embodiment of the present invention.

FIG. 5 is a timing chart illustrating a common voltage and sensor scanning signals.

As shown in FIG. 5, the common voltage Vcom swings between a third high voltage level and a third low voltage level and has a "2H" period. When the common voltage Vcom has a level of the third high voltage, the signal controller 600 outputs the switching signal SW having a high voltage level to the initializing unit 900 to initialize the sensor data lines $P_1$-$P_M$ with the initializing voltage Vd by "2H" period. However, when the common voltage Vcom has a level of the third low voltage, that is, in reading the sensor data signals, the signal controller 600 outputs the switching signal SW having a low voltage level, to cause the sensor data lines $P_1$-$P_M$ to be in a floating state.

The pulse width of the switching signal SW is narrower than "1H." The switching signal SW maintains the low voltage level while the level of the common voltage Vcom is changed. As described above, since while the common voltage Vcom has the third high voltage level, the contact voltage Vp between the reference capacitor Cp and the variable capacitor Cv is initialized with the initializing voltage Vd, consistency of the sensor data signals is maintained.

When the common voltage Vcom is the third low voltage level, the sensor scanning driver 700 sequentially outputs the sensor scanning signals Vs1, Vs2, . . . , etc., having a level of the second high voltage to the sensor scanning lines $S_1$-$S_N$, to operate scanning. Each pulse width of the second high voltages of the sensor scanning signals Vs1, Vs2, . . . , etc., is "1H". As shown in FIG. 5, when a vertical resolution of the pixels PX is four times larger than that of the sensing units, the sensor scanning signals Vs1, Vs2, . . . , etc., are sequentially applied every "4H."

By contrast, when the common voltage Vcom has the level of the third low voltage, the sensor scanning lines $P_1$-$P_M$ may be initialized, and when the common voltage Vcom has the level of the third high voltage, the scanning may be operated. Furthermore, the common voltage Vcom may be a DC (direct current) voltage having a predetermined and constant level.

When the common voltage Vcom has the level of the second high voltage, the sensing signal processor 800 reads the sensor data signals from the sensor data lines $P_1$-$P_M$, and then after amplifying or filtering the read sensor data signals, converts the sensor data signals into the digital sensing signal DSN to send to the signal controller 600. The signal controller 600 suitably processes the digital sensing signal DSN (FIG. 3) to carry out the touch recognition operation for determining touch information such as 'touch' or 'no touch' and a touch position, and to send the information to an external device (not shown). The external device sends the image signals R, G, and B to the LCD based on the information. In alternative embodiments, the sensing signal processor 800 directly outputs the digital sensing signal DSN to the external device and the external device may execute the touch recognition operation.

In exemplary embodiments, the above sensing operation is repeated every frame. However, it will be understood that the sensing operation may be repeated every several frames.

Figure 6:
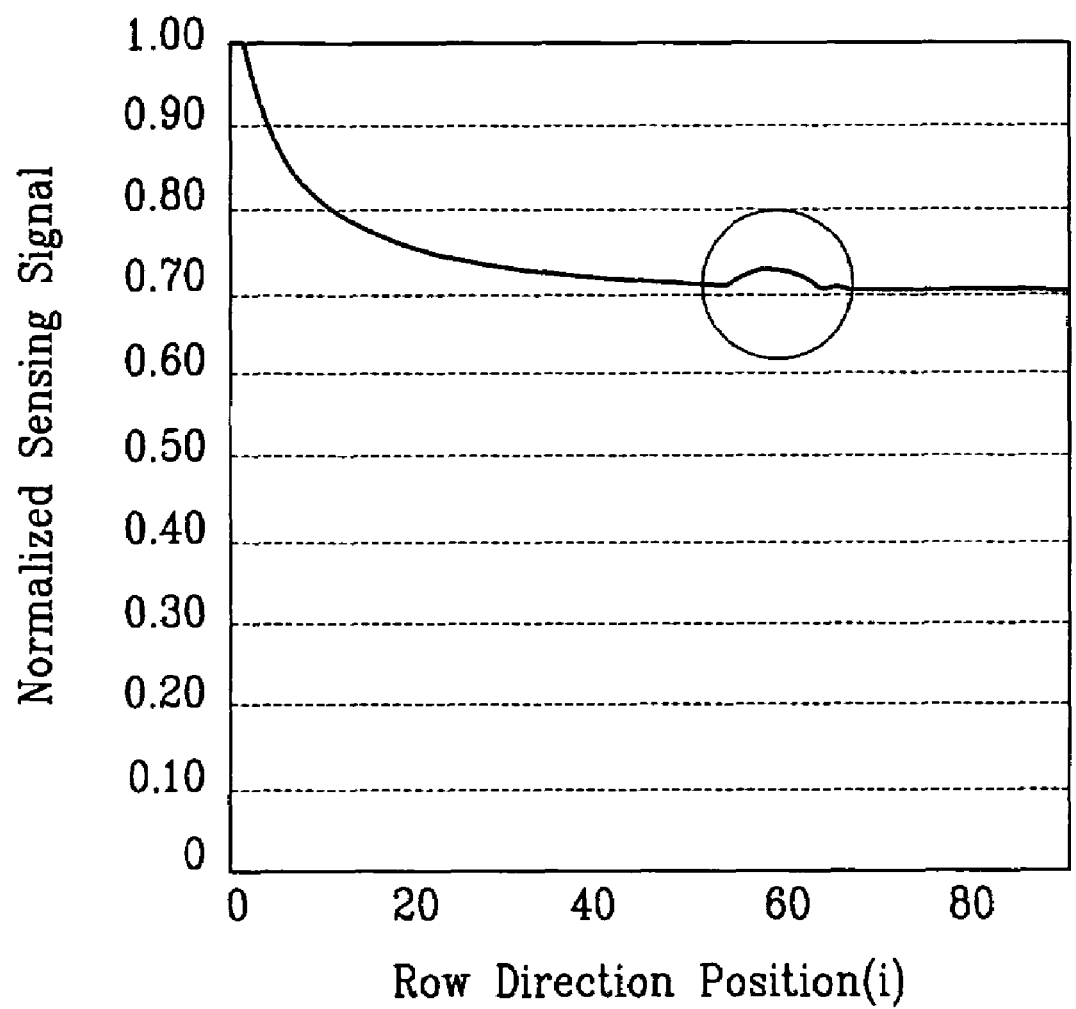
FIG. 6 is a graph illustrating a sensing signal upon contact with an LCD according to an exemplary embodiment of the present invention.

Turning now to FIG. 6, and with reference to FIGS. 1-4, the operation and a sensing signal of a sensing unit by a touch to the LC panel assembly 300 will now be described in accordance with an exemplary embodiment.

FIG. 6 is a graph illustrating a sensing signal derived by contact with an LCD according to an exemplary embodiment of the present invention. The sensing signal is obtained by suitably processing a sensor data signal flowing through one of sensor data lines $P_1$-$P_M$ when, for one frame, each sensor scanning line $S_1$-$S_N$ is sequentially supplied with the second high voltage.

The sensing signal is measured in response to a touch to the LC panel assembly 300. The number of sensor scanning lines $S_1$-$S_N$ is about 84, and the X axis indicates positions of a row direction of the LC panel assembly 300 and the Y axis indicates the normalized sensing signal.

When the LC panel assembly 300 is pressed by a finger, touch pen, etc., the spacers disposed between panels 100 and 200 (FIGS. 2, 4) are transformed by the pressure applied thereby, which causes a touch portion of the upper panel 200 of the assembly 300 to become closer to the lower panel 100 which decreases the interval between the panels 100 and 200. As a result, the interval between the common electrode 270 of the upper panel 200 and the sensor data lines $P_1$-$P_M$ also decreases, to increase capacitance of the variable capacitor Cv near the touch portion. Accordingly, the contact voltage Vp between the reference capacitor Cp and the variable capacitor Cv near the touch portion varies compared to other portions at which the contact does not occur. The contact voltage Vp of the reference capacitor Cp supplied with the second high voltage highly influences the sensor data signal as compared with the contact voltage Vp of the reference capacitor Cp supplied with the second low voltage. Thereby, the contact voltage Vp of the reference capacitor Cp supplied with the second low voltage has almost no influence on the sensor data signal in spite of being near the touch portion.

As shown in the circle of FIG. 6, since the magnitude of the sensing signal near the touch portion suddenly becomes larger (or may become less) than that of other portions, the touch position of the column direction is determined using the variation of the sensing signal. In the absence of touch, in the same sensor data lines $P_1$-$P_M$, the magnitude of the sensing signal from each sensing unit connected to each image scanning line $G_1$-$G_n$ decreases as the number of image scanning lines $G_1$-$G_n$ becomes large due to RC delay, etc. However, since the magnitude of the sensing signal near the touch portion is relatively larger than that of the surrounding portions of the touch portion, the sensing signal processor 800 easily determines the touch position.

When the second high voltage is applied to each sensor scanning line $S_1$-$S_N$, the total sensor data lines $P_1$-$P_M$, the sensing signal processor 800 processes sensor data signals of one sensing unit row outputted from the sensor data lines $P_1$-$P_M$, to detect a touch position of the row direction.

Accordingly, when a user touches the LC panel assembly 300, the sensing signal processor 800 analyzes sensing signals of one frame to determine a touch position of the row and column directions.

In accordance with exemplary embodiments, the structure of the LC panel assembly 300 will now be described with reference to FIGS. 7 through 10.

Figure 7:
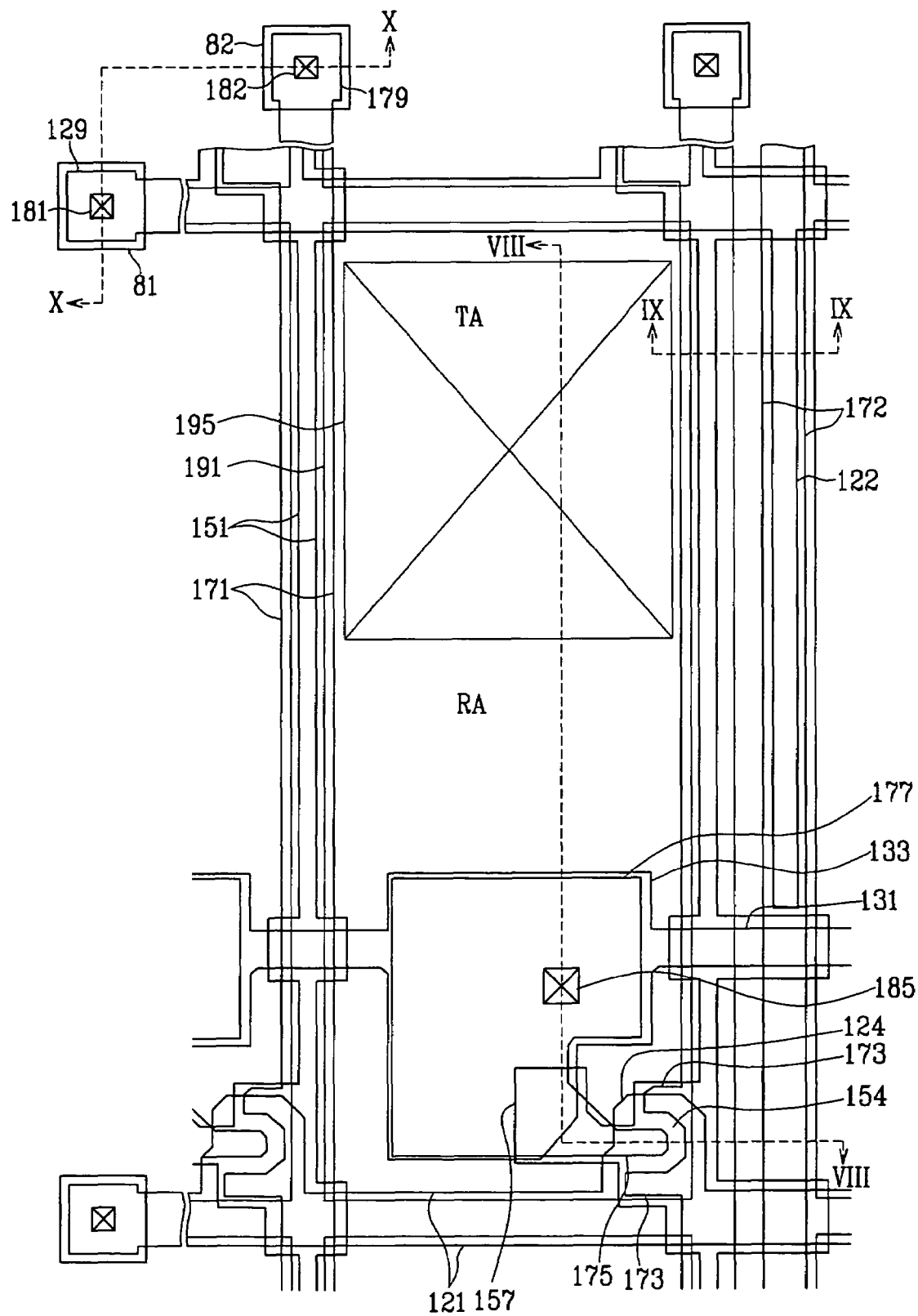
FIG. 7 is a layout view of an LC panel assembly according to an exemplary embodiment of the present invention.
Figure 8:
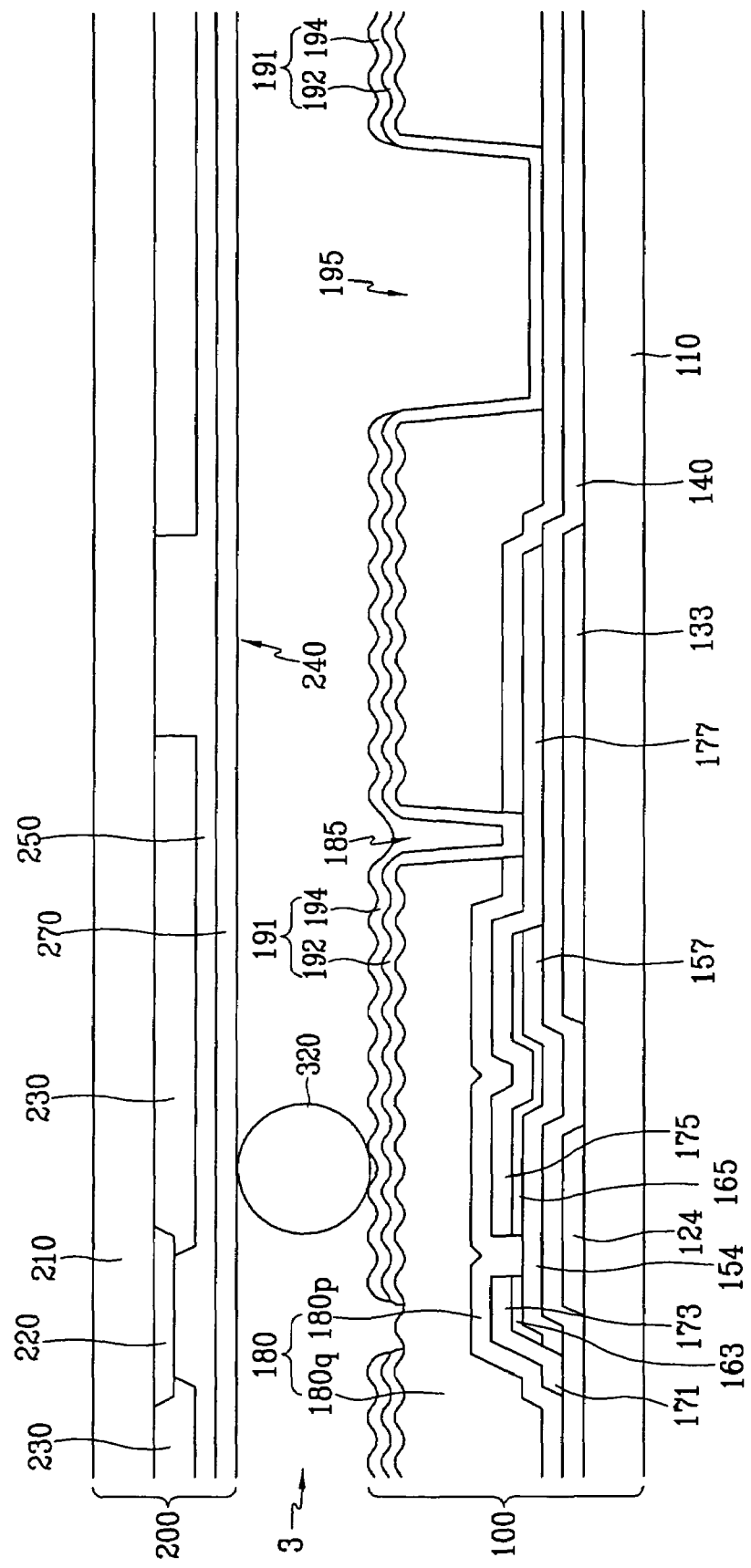
FIGS. 8 through 10 depict cross-sectional views of the LC panel assembly shown in FIG. 7 taken along the lines VIII-VIII, IX-IX, and X-X, respectively.
Figure 9:
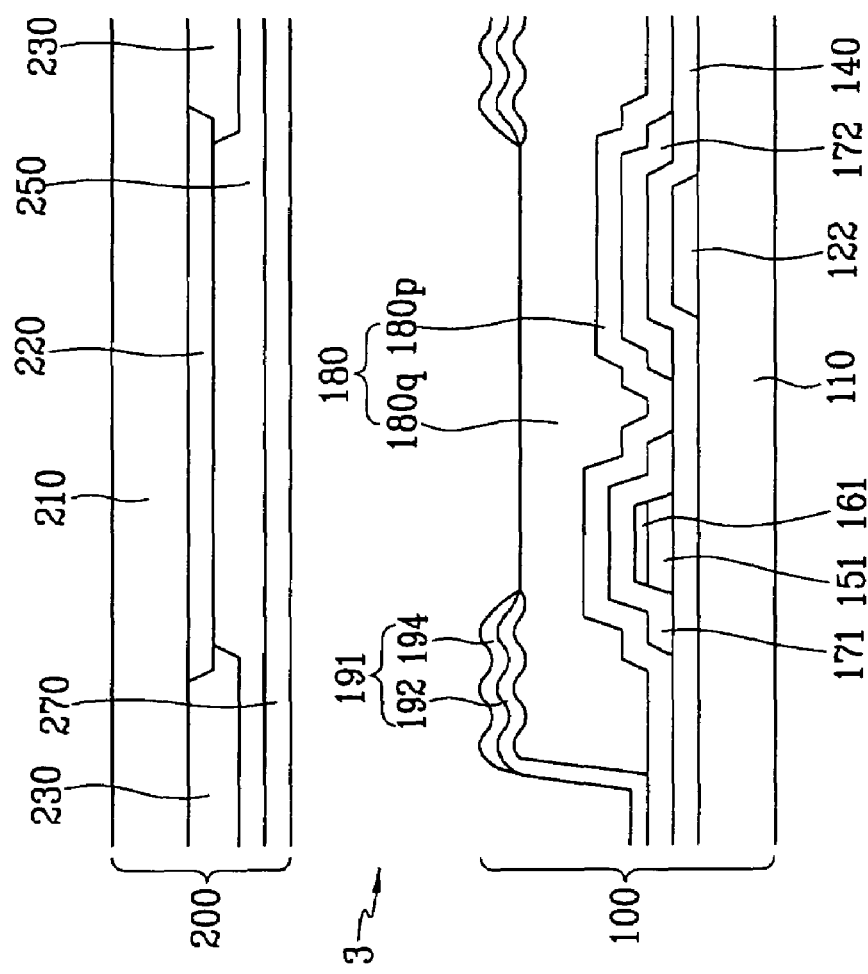
Figure 10:
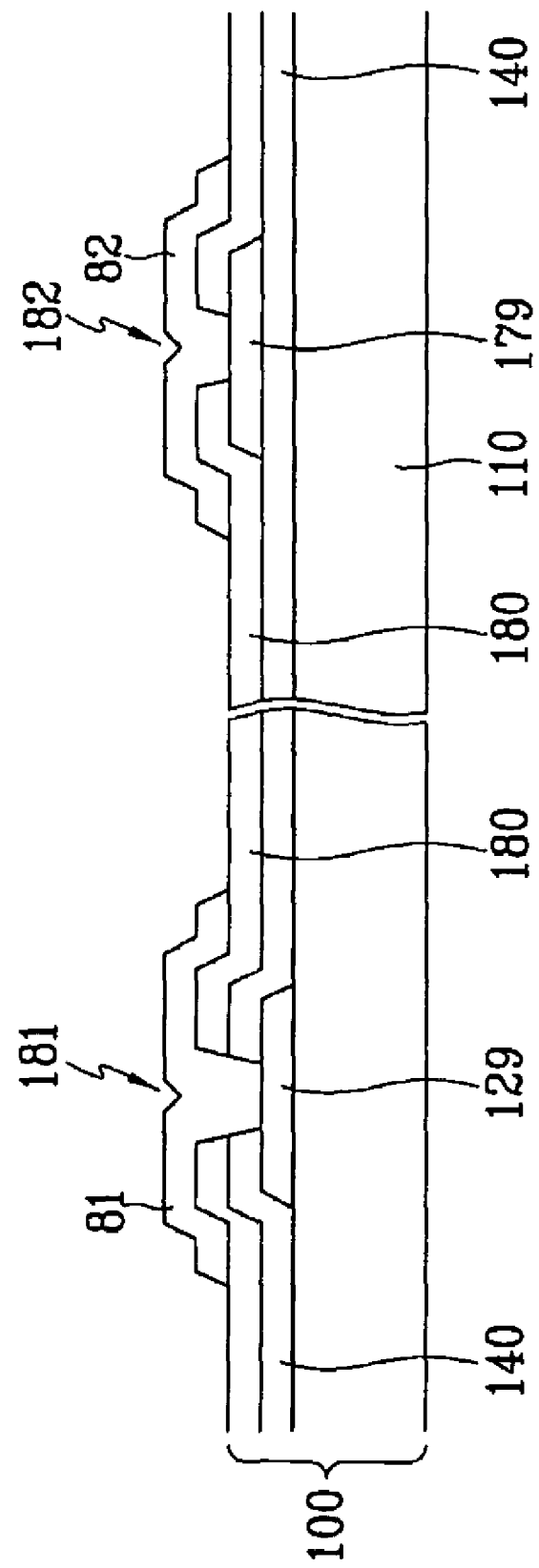

FIG. 7 is a plan view illustrating a layout of an exemplary embodiment of an LC panel assembly of the present invention, and FIGS. 8 through 10 are cross-sectional views of the LC panel assembly shown in FIG. 7 taken along the lines VIII-VIII, IX-IX, and X-X, respectively.

As previously described in FIGS. 2 and 4, the LC panel assembly 300 includes a lower panel 100, an upper panel 200 facing the lower panel 100, and an LC layer 3 interposed between the panels 100 and 200.

The lower panel 100 will now be described in further detail with respect to FIGS. 7 through 10.

A plurality of image scanning lines 121 and storage electrode lines 131 are formed on an insulating substrate 110 of the lower panel 100. The insulating substrate 110 may be made of a material such as transparent glass or plastic.

The image scanning lines 121 transmit image scanning signals and extend substantially in a transverse direction. Each of the image scanning lines 121 includes a plurality of control electrodes 124 projecting upward, an end portion 129 having a large area for contact with another layer or an external driving circuit, and a long reference electrode 122 extending downward and facing the storage electrode line 131.

An image scanning driving circuit (not shown) for generating the image scanning signals may be mounted on a flexible printed circuit (FPC) film (not shown), which may be, e.g., attached to the substrate 110, directly mounted on the substrate 110, or integrated with the substrate 110. The image scanning lines 121 may extend to be connected to a driving circuit (not shown) that may be integrated on the substrate 110.

The storage electrode lines 131 are supplied with a predetermined voltage and extend substantially in parallel to the image scanning lines 121. Each of the storage electrode lines 131 is disposed between two adjacent image scanning lines 121 and is closer to the lower image scanning line of the two adjacent image scanning lines 121. Each of the storage electrode lines 131 includes a plurality of storage electrodes 133 expanding upward and downward. However, it will be understood that the storage electrode lines 131 may have various shapes and arrangements.

The image scanning lines 121 and the storage electrode lines 131 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, it will be understood that the image scanning lines 121 and the storage electrode lines 131 may have a multi-layered structure including two conductive films (not shown) having different physical characteristics. One of the two films is preferably made of a low resistivity metal including an Al-containing metal, a Ag-containing metal, and a Cu-containing metal for reducing signal delay or voltage drop. The other film is preferably made of a material such as a Mo-containing metal, Cr, Ta, or Ti, which has good physical, chemical, and electrical contact characteristics with other materials such as indium tin oxide (ITO) or indium zinc oxide (IZO). Examples of the combination of the two films include a lower Cr film and an upper Al (alloy) film and a lower Al (alloy) film and an upper Mo (alloy) film. However, it will be understood that the image scanning lines 121 and the storage electrode lines 131 may be made of various metals or conductors.

The lateral sides of the image scanning lines 121 and the storage electrode lines 131 are inclined relative to a surface of the substrate 110, and the inclination angles thereof are in a range of about 30 degrees to about 80 degrees.

An insulating layer 140 preferably made of silicon nitride (SiNx) or silicon oxide (SiOx) is formed on the image scanning lines 121 and the storage electrode lines 131.

A plurality of semiconductor stripes 151 preferably made of hydrogenated amorphous silicon (abbreviated to "a-Si") or polysilicon are formed on the insulating layer 140. Each of the semiconductor stripes 151 extends substantially in the longitudinal direction and includes a plurality of projections 154 branched out toward the control electrodes 124 and a plurality of projections 157 branched out toward the storage electrodes 133. The semiconductor stripes 151 become wide near the image scanning lines 121 and the storage electrode lines 131 such that the semiconductor stripes 151 widely cover the image scanning lines 121 and the storage electrode lines 131.

A plurality of ohmic contact stripes and islands 161 and 165, respectively, are formed on the semiconductor stripes 151. The ohmic contact stripes and islands 161 and 165 are preferably made of n+ hydrogenated a-Si heavily doped with an n-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contact stripes 161 and islands 165 are inclined relative to the surface of the substrate 110, and the inclination angles thereof are preferably in a range of about 30 degrees to about 80 degrees.

A plurality of image data lines 171, a plurality of output electrodes 175, and a plurality of sensor data lines 172 are formed on the ohmic contact stripes 161 and islands 165 and the insulating layer 140.

The image data lines 171 transmit image data signals and extend substantially in the longitudinal direction to intersect the image scanning lines 121 and the storage electrode lines 131. Each image data line 171 includes a plurality of input electrodes 173 projecting toward the control electrodes 124, and an end portion 179 having a large area for contact with another layer or an external driving circuit. An image data driving circuit (not shown) for generating the image data signals may be mounted on an FPC film (not shown), which may be attached to the substrate 110, directly mounted on the substrate 110, or integrated with the substrate 110. The image data lines 171 may extend to be connected to a driving circuit that may be integrated with the substrate 110.

The output electrodes 175 are separated from the image data lines 171 and are disposed opposite the input electrodes 173 with respect to the control electrodes 124. Each output electrode 175 has a wide and rectangular shaped expansion 177 overlapping the storage electrode 133, and a bar-shaped portion, of which a portion is surrounded by a curved portion of input electrode 173.

A control electrode 124, an input electrode 173, and an output electrode 175 along with a projection 154 of a semiconductor stripe 151 form a TFT having a channel formed in the projection 154 disposed between the input electrode 173 and the output electrode 175.

The sensor data lines 172 transmit sensor data signals and extend substantially in the longitudinal direction to intersect the image scanning lines 121 and the storage electrode lines 131. Each sensor data line 172 is separated from the image data line 171 by a predetermined interval, extends in parallel thereto, and overlaps the reference electrode 122.

The image data lines 171, sensor data lines 172, the output electrodes 175 are preferably made of a refractory metal such as Cr, Mo, Ta, Ti, or alloys thereof. Alternatively, they may have a multilayered structure including a refractory metal film (not shown) and a low resistivity film (not shown). Examples of the multi-layered structure include a double-layered structure including a lower Cr/Mo (alloy) film and an upper Al (alloy) film, and a triple-layered structure of a lower Mo (alloy) film, an intermediate Al (alloy) film, and an upper Mo (alloy) film. However, it will be understood that the image data lines 171, the sensor data lines 172, and the output electrodes 175 may be made of various metals or conductors.

The image data lines 171, the sensor data lines 172, and the output electrodes 175 have inclined edge profiles, and the inclination angles thereof range from about 30 degrees to about 80 degrees.

The ohmic contact stripes 161 and islands 165 are interposed only between the underlying semiconductor stripes 151 and the overlying conductors (e.g., image data lines 171, sensor data lines 172, and output electrodes 175) thereon, and reduce the contact resistance therebetween. Although the semiconductor stripes 151 are narrower than the image data lines 171 at most places, the width of the semiconductor stripes 151 becomes large near the image scanning lines 121 and the storage electrode lines 131 as described above, to smooth the profile of the surface, thereby preventing the disconnection of the image data lines 171 and sensor data lines 172. The semiconductor stripes 151 include some exposed portions, which are not covered with the image data lines 171 and the output electrodes 175, such as portions located between the input electrodes 173 and the output electrodes 175.

A passivation layer 180 is formed on the image data lines 171, the sensor data lines 172, the output electrodes 175, and the exposed portions of the semiconductor stripes 151. The passivation layer 180 includes a lower passivation film 180$p$ preferably made of an inorganic insulator such as silicon nitride or silicon oxide, and an upper passivation film 180$q$ preferably made of an organic insulator. Preferably, the upper passivation film 180$q$ may have dielectric constant of less than about 4.0, and photosensitivity. The upper passivation film 180$q$ has an embossed surface. However, it will be understood that the passivation layer 180 may have a single-layer structure preferably made of an inorganic or organic insulator.

The upper passivation film 180$q$ is removed on the end portions 129 and 179 of the image scanning lines 121 and the image data lines 171, respectively, to expose the lower passivation film 180$p$.

The passivation layer 180 has a plurality of contact holes 182 and 185 exposing the end portions 179 of the image data lines 171 and the output electrodes 175, respectively. The passivation layer 180 and the insulating layer 140 have a plurality of contact holes 181 exposing the end portions 129 of the image scanning lines 121.

A plurality of pixel electrodes 191 and a plurality of contact assistants 81 and 82 are formed on the passivation layer 180.

The pixel electrodes 191 are curved along the embossed surface of the upper passivation film 180$q$. Each of the pixel electrodes 191 includes a transmissive electrode 192 and a reflective electrode 194 thereon. The transmissive electrodes 192 are preferably made of a transparent conductor such as ITO or IZO, and the reflective electrodes 194 are preferably made of a reflective conductor such as Ag, Al, Cr, or alloys thereof.

However, it will be understood that the reflective electrodes 194 may have a double-layered structure including an upper reflective film having low resistivity, such as Al, Ag, or alloys thereof, and a lower film made of a Mo-containing metal, Cr, Ta, or Ti, which has good contact characteristics with ITO or IZO.

Each reflective electrode 194 includes a transmission window 195 disposing into an opening of the upper passivation 180$q$ and exposing the transmissive electrode 192.

The pixel electrodes 191 are physically and electrically connected to the output electrodes 175 through the contact holes 185 such that the pixel electrodes 191 receive data voltages from the output electrodes 175.

The pixel electrodes 191 that are supplied with the data voltages generate electric fields in cooperation with the common electrode 270 of the opposing upper panel 200 that is supplied with a common voltage, which determine the orientations of LC molecules (not shown) of an LC layer 3 disposed between the two panels 100 and 200. The polarization of light passing through the LC layer 3 is varied based on the orientations of the determined LC molecules. A pixel electrode 191 and the common electrode 270 form a capacitor referred to as a "liquid crystal capacitor," which stores applied voltages after the TFT turns off.

A transflective LCD having the lower panel 100, the upper panel 200, and the LC layer 3 includes a plurality of transmissive regions TA and a plurality of reflective regions RA. Each of the transmissive regions TA is defined by the transmissive electrodes 192, and each of the reflective regions RA is defined by the reflective electrodes 194. In detail, portions under or over the transmission windows 195 are to be transmissive regions TA, respectively, and portions disposed under or over the reflective electrodes 194 are to be the reflective regions RA, respectively.

In the transmissive regions TA, light from a backlight unit (not shown) disposed under the lower panel 100 passes through the LC layer 3 and the upper panel 200 to display desired images. In the reflective regions RA, external light such as sunlight is incident on the upper panel 200 and passes through it and the LC layer 3 to reach the reflective electrodes 194. Then, the external light is reflected by the reflective electrodes 194 and passes through the LC layer 3 again. At this time, the reflective efficiency of light is enhanced by the embossed surfaces of the reflective electrodes 194.

A pixel electrode 191 and an expansion 177 of an output electrode 175 connected thereto overlap a storage electrode 133. The pixel electrode 191, an output electrode 175 connected thereto, and the storage electrode 133 form a storage capacitor $C_{ST}$, respectively, which enhances the voltage storing capacity of the LC capacitor $C_{LC}$.

A reference electrode 122 overlaps a sensor data line 172 through the insulating layer 140 disposed therebetween, to form a reference capacitor Cp. A sensor data line 172 overlaps the common electrode 270 disposed on the upper panel 200 through the passivation layer 180 and the LC layer 3 disposed therebetween, to form a variable capacitor Cv. Accordingly, as shown in FIG. 3, a plurality of variable capacitors Cv are continuously formed along one sensor data line 172, but a plurality of reference capacitors Cp are separately formed along one sensor data line 172, respectively.

Returning to FIGS. 7 through 10, the contact assistants 81 and 82 are connected to the end portions 129 of the image scanning lines 121 and the end portions 179 of the image data lines 171 through the contact holes 181 and 182, respectively. The contact assistants 81 and 82 protect the end portions 129 and 179 and enhance the adhesion between the end portions 129 and 179 and external devices.

The common electrode panel 200 will now be described in exemplary embodiments with respect to FIGS. 7 through 10.

A light blocking member 220, referred to as a black matrix, for preventing light leakage is formed on an insulating substrate 210 made of a material such as transparent glass or plastic.

The light blocking member 220 has a plurality of openings (not shown) that face the pixel electrodes 191 and prevent light leakage between two adjacent pixels.

A plurality of color filters 230 are also formed on the substrate 210, and they are disposed substantially in the areas enclosed by the light blocking member 220. The color filters 230 may extend substantially in the longitudinal direction along the pixel electrodes 191. The color filters 230 may represent one of various colors, such as primary colors of red, green, and blue.

Each of the color filters 230 in the reflective regions RA includes light holes 240. The light holes 240 compensate a difference in color tone between the reflective region RA and the transmissive region TA due to a difference of the number of light rays transmitting through the color filters 230. Alternatively, the difference of color tone may be compensated by changing the thicknesses of the color filters 230 in the transmissive region TA and the reflective region RA.

An overcoat 250 is formed on the color filters 230 and the light blocking members 220. The overcoat 250 is also formed into the light holes 240. The overcoat 250 is preferably made of an (organic) insulator, and it prevents the color filters 230 from being exposed and provides a flat surface. However, portions of the overcoat 250 facing the sensor data lines 172 protrude to form protrusions. In alternative embodiments, the overcoat 250 may be omitted.

A common electrode 270 is formed on the overcoat 250. The common electrode 270 is preferably made of a transparent conductive material such as ITO and IZO.

Alignment layers (not shown) are coated on inner surfaces of the panels 100 and 200, and polarizers (not shown) are provided on outer surfaces of the panels 100 and 200.

The LC layer 3 is horizontally or vertically aligned. A thickness of the LC layer 3 in the transmissive regions TA is twice than that in the reflective regions RA, because the upper passivation layer 180q is removed on the transmissive regions TA.

The LC panel assembly 300 further includes a plurality of elastic spacers (FIG. 8). The spacers 320 have a circular or elliptical shape and are dispersed on the LC panel assembly 300 to form a predetermined gap between panels 100 and 200. A size or shape of the spacers 320 vary in response to pressure applied to the panel. In alternative embodiments, the spacers 320 may be have a column shape. The spacers 320 may alternatively be rigid spacers and regularly arranged.

Also, the TFT array panel 100 and the common electrode panel 200 of the LC panel assembly 300 may be sealed with a sealant. The sealant is disposed on the boundary of the common electrode panel 200.

In exemplary embodiments of the present invention, the sensor data lines 172 are formed on the same layer as the image data lines 171. However, it will be understood that the sensor data lines 172 may be alternatively formed on the same layer as the transmissive electrode 192 or reflective electrodes 194. The sensor data lines 172 may be made of a material such as ITO, IZO, or Al.

Furthermore, sensor scanning lines may be formed on the same layer as the image scanning lines 121. In this case, the sensor scanning lines overlap the sensor data lines 172 instead of the image scanning lines 121, to form reference capacitors Cp.

According to an exemplary embodiment of the present invention, the variable capacitors and the reference capacitors are integrated with the LC panel assembly 300 to detect a touch and the touch position.

While the present invention has been described in detail with reference to the exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
  a first panel;
  a second panel facing and separated from the first panel;
  a plurality of sensor scanning lines disposed on the second panel;
  a plurality of sensor data lines formed on the second panel;
  a liquid crystal layer interposed between the first and second panels;
  a plurality of variable capacitors, whose capacitance thereof is varied by pressure; and
  a plurality of reference capacitors formed on the second panel,
  wherein a first electrode of each variable capacitor is connected to a first electrode of a corresponding one of the reference capacitors and is directly connected to one of the sensor data lines,
  a second electrode of the corresponding one of the reference capacitors is connected to one of the sensor scanning lines, and
  a touch position is detected by sensing a voltage of the first electrode of each variable capacitor.

2. The liquid crystal display of claim 1, wherein the first panel comprises a common electrode, and a second electrode of each variable capacitor is connected to the common electrode.

3. The liquid crystal display of claim 2, wherein the distance between the first and second electrodes of each variable capacitor is varied by pressure on the first panel, and the capacitances of the variable capacitors are varied based on variation of the distance.

4. The liquid crystal display of claim 2, wherein the second electrode of each variable capacitor is supplied with a predetermined voltage that swings between two different magnitudes thereof.

5. The liquid crystal display of claim 1, further comprising a plurality of switching circuits, each switching circuit being connected to one of the sensor data lines and charging the first electrode of each variable capacitor with predetermined voltages.

6. The liquid crystal display of claim 1, further comprising:
a plurality of image scanning lines formed on the second panel;
a plurality of image data lines intersecting the image scanning lines; and
a plurality of pixels connected to the image scanning lines and the image data lines.

7. The liquid crystal display of claim 6, wherein the image scanning lines are used as the sensor scanning lines.

8. A liquid crystal display comprising:
a plurality of image scanning lines;
a plurality of image data lines intersecting the image scanning lines;
a plurality of sensor data lines intersecting the image scanning lines;
a plurality of sensor scanning lines intersecting the sensor data lines;
a plurality of pixels connected to the image scanning lines and the image data lines; and
a plurality of sensing units connected to the sensor data lines,
wherein the pixels comprise liquid crystal capacitors and switching elements connected to the liquid crystal capacitors, one of the image scanning lines, and one of the image data lines, respectively,
wherein the sensing units comprise:
variable capacitors having capacitance which varies based on pressure; and
reference capacitors,
wherein a sensing electrode of each variable capacitor is connected to a first electrode of a corresponding one of the reference capacitors and one of the sensor data lines,
a second electrode of the corresponding one of the reference capacitors is connected to one of the sensor scanning lines, and
the sensing unit detects a touch position by sensing a voltage of the sensing electrode of each variable capacitor.

9. The liquid crystal display of claim 8, wherein a common electrode is connected to an electrode of each variable capacitor different from the sensing electrode, and
a liquid crystal dielectric is interposed between the electrode of each variable capacitor different from the sensing electrode.

10. The liquid crystal display of claim 8, wherein the liquid crystal capacitor comprises a pixel electrode, a common electrode facing the pixel electrode, and a liquid crystal dielectric interposed between the pixel electrode and the common electrode.

11. The liquid crystal display of claim 8, further comprising:
an image scanning driver for applying image scanning signals to the image scanning lines;
an image data driver for applying image data signals to the image data lines;
a sensing signal processor for processing sensing signals from the sensor data lines; and
a signal controller for controlling the image scanning driver, the image data driver, and the sensing signal processor.

12. The liquid crystal display of claim 8, wherein the image scanning lines are used as the sensor data lines.

13. The liquid crystal display of claim 8, further comprising:
an image scanning driver for applying image scanning signals to the image scanning lines;
an image data driver for applying image data signals to the image data lines;
a sensor scanning driver for applying sensor scanning signals to the sensor scanning lines;
a sensing signal processor for processing sensing signals from the sensor data lines; and
a signal controller for controlling the image scanning driver, the image data driver, the sensor scanning driver, and the sensing signal processor.

14. A liquid crystal display comprising:
a first panel comprising a common electrode;
a second panel facing and separated from the first panel;
an image scanning line formed on the second panel;
an image data line formed on the second panel and intersecting the image scanning line;
a thin film transistor connected to the image scanning line and the image data line;
a pixel electrode connected to the thin film transistor and facing the common electrode;
a sensor data line formed on the second panel, extending in parallel to the image data line, and facing the common electrode;
a sensor scanning line disposed on the second panel;
a reference electrode formed on the second panel wherein the reference electrode extends from the sensor scanning line and overlaps a part of the sensor data line and a reference capacitor is formed by the reference electrode and the part of the sensor data line; and
a liquid crystal layer interposed between the first and second panel;
wherein a voltage of the sensor data line is varied by a variance of capacitance formed by the common electrode, the sensor data line and the liquid crystal layer,
the capacitance varies according to pressure on the first panel, and
touch positions are detected by the voltage of the sensor data line.

15. The liquid crystal display of claim 14, wherein the image scanning line is used as the sensor scanning line.

16. The liquid crystal display of claim 14, wherein the sensor data line is formed on the same layer as the image data line.

17. The liquid crystal display of claim 14, wherein the sensor data line is formed on the same layer as the pixel electrode.

18. The liquid crystal display of claim 14, wherein the pixel electrode comprises a transmissive electrode and a reflective electrode, and the sensor data line is formed on the same layer as one of the transmissive electrode and the reflective electrode.

19. The liquid crystal display of claim 14, further comprising a spacer disposed between the first and second panels, the spacer supporting the first and second panels and forming a predetermined gap therebetween.

20. The liquid crystal display of claim 14, further comprising an insulator disposed between the reference electrode and the part of the sensor data line.

21. The liquid crystal display of claim 20, wherein the reference capacitor is formed by the reference electrode, the insulating layer and the part of the sensor data line.

22. The liquid crystal display of claim 1, wherein the second electrode of the corresponding one of the reference capacitors is directly connected to the one of the sensor scanning lines.

* * * * *